May 18, 1937.  H. SASS  2,081,020
EDUCATIONAL SKILL GAME
Filed Jan. 8, 1935   3 Sheets-Sheet 1
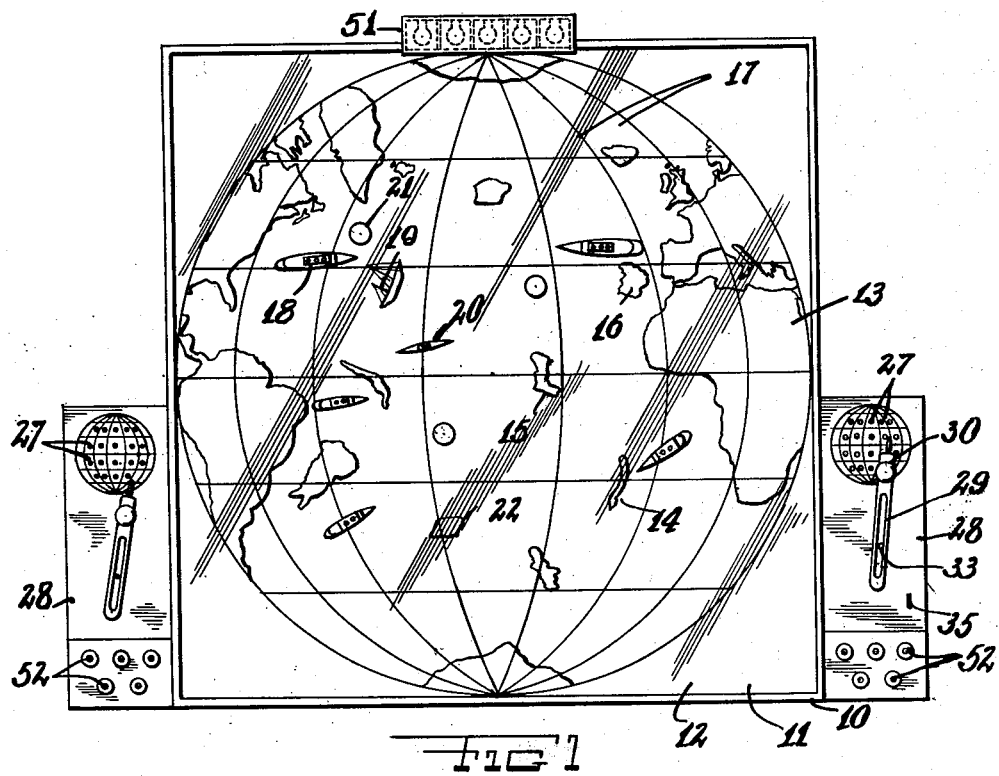
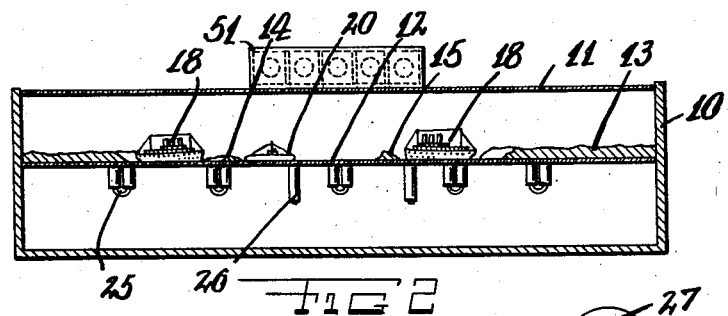
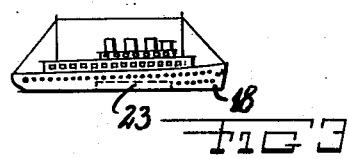
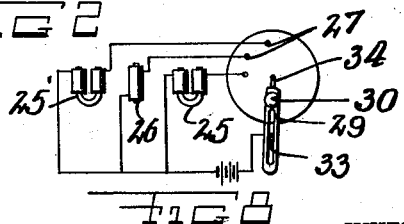
INVENTOR
Harold Sass
BY
ATTORNEY May 18, 1937.  H. SASS  2,081,020
EDUCATIONAL SKILL GAME
Filed Jan. 8, 1935   3 Sheets-Sheet 2
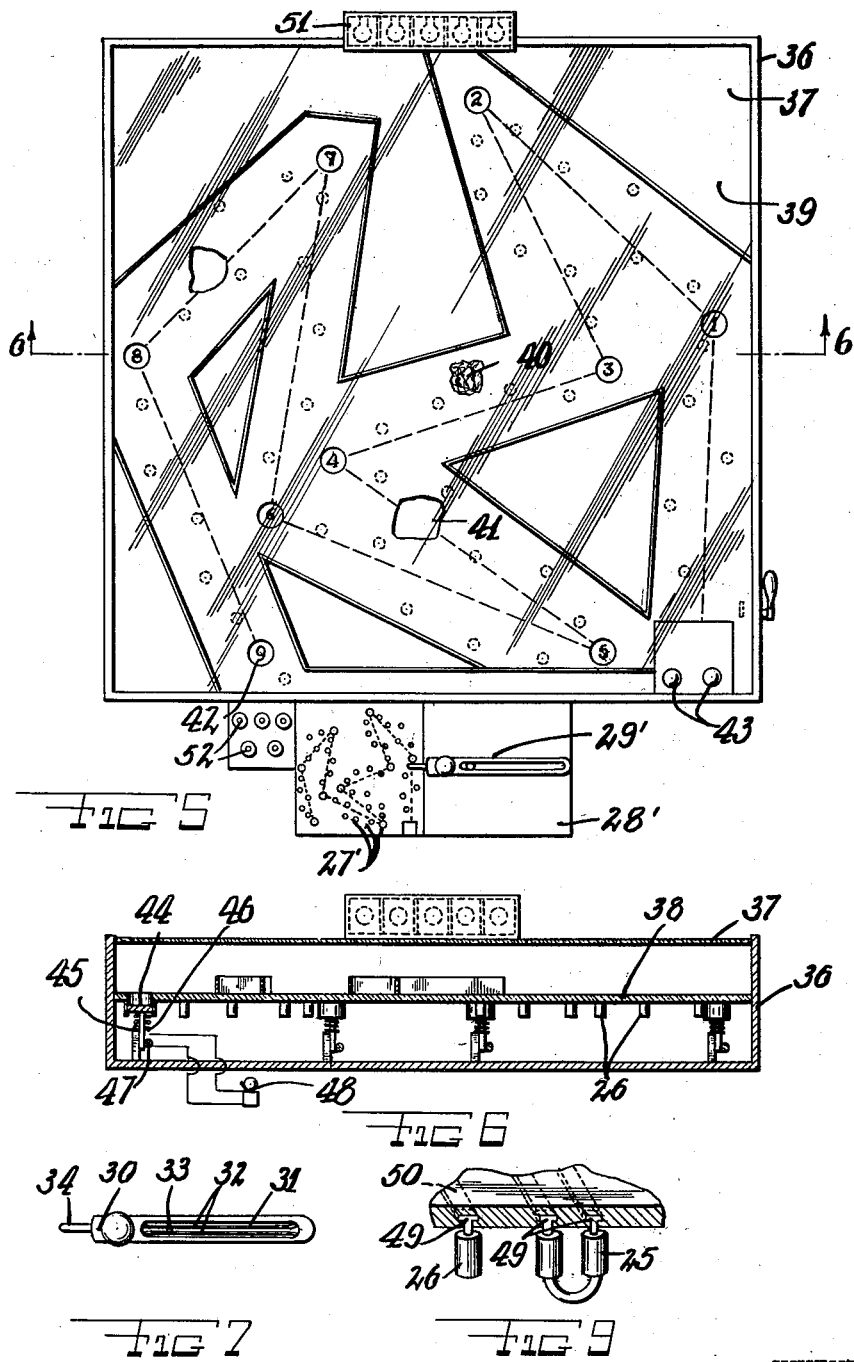
INVENTOR
Harold Sass
BY
ATTORNEY May 18, 1937.  H. SASS  2,081,020
EDUCATIONAL SKILL GAME
Filed Jan. 8, 1935   3 Sheets-Sheet 3
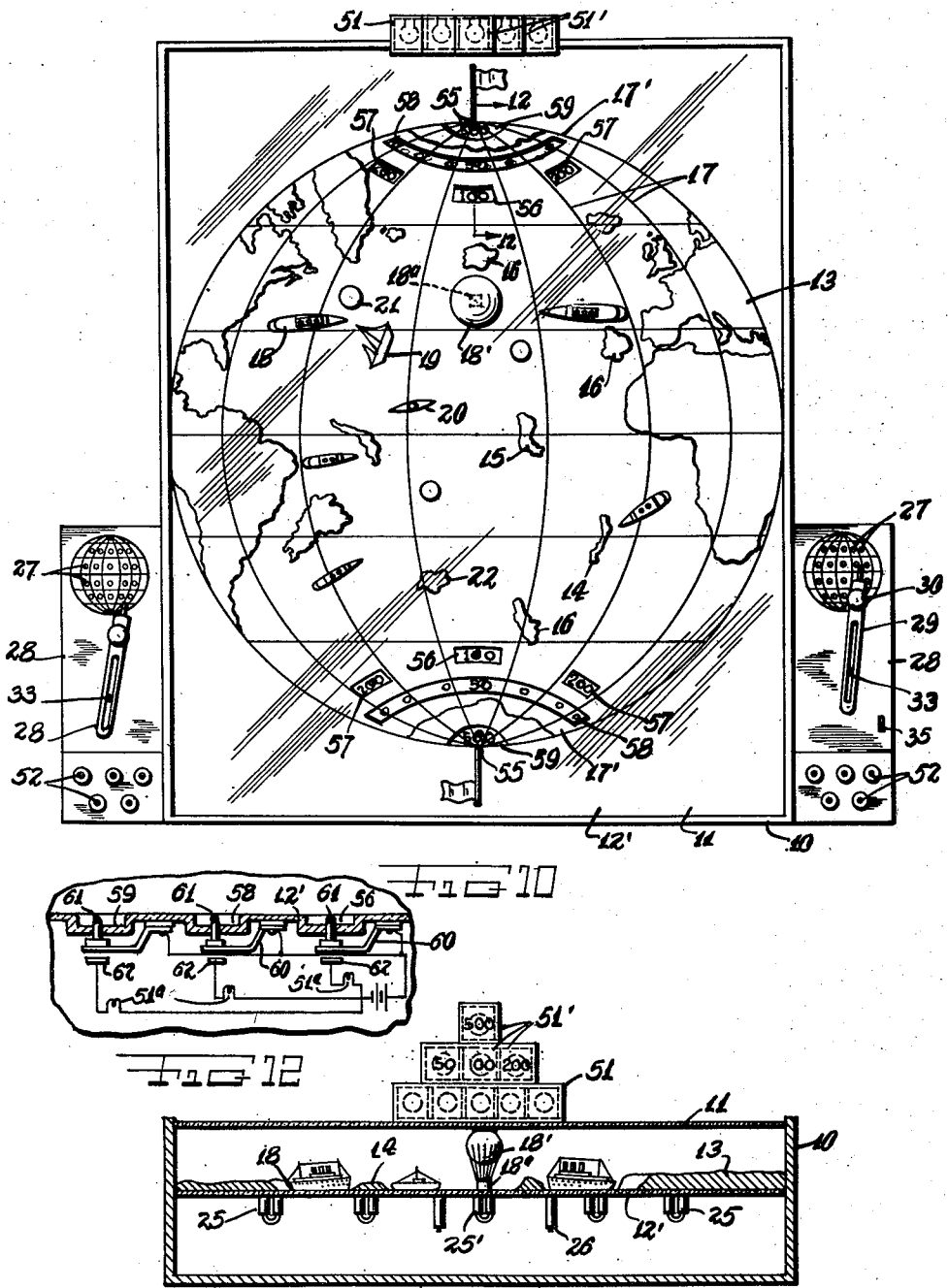

Patented May 18, 1937

2,081,020

UNITED STATES PATENT OFFICE 2,081,020

EDUCATIONAL SKILL GAME

Harold Sass, New York, N. Y.

Application January 8, 1935, Serial No. 811

2 Claims. (Cl. 273—130)

This invention relates to new and useful improvements in educational games.

The invention has for an object the provision of a device of the class mentioned which is of simple durable construction, dependable in use and efficient in action, and which may be manufactured and sold at a reasonable cost.

The invention proposes an educational game including a box with a horizontal partition having various stationary objects secured on its top surface and other various movable objects loose on the top surface, permanent magnets to be arranged within the loose objects and stationary electro-magnets to be secured to the bottom of the partition and connected with a contact board provided with an operating lever for individually energizing any of the electro-magnets so that players may cause the loose objects to move upon the partition and perform certain features according to rules laid down to play the game. The loose objects may move in various directions and moving for scoring the greatest amount depends upon the skill of the player in properly energizing the electro-magnets at the proper times.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of a device constructed according to this invention.

Fig. 2 is a vertical sectional view thereof.

Figs. 3 and 4 are side elevational views of some of the movable objects used in the game.

Fig. 5 is a plan view of a device of modified form constructed according to the same invention.

Fig. 6 is a vertical sectional view taken on the line 6—6 of Fig. 5.

Fig. 7 is a detail view of the operating lever used in the devices.

Fig. 8 is a fragmentary schematic wiring diagram of the devices.

Fig. 9 is a fragmentary perspective view of a portion of the partition used in the game.

Fig. 10 is a similar view to Fig. 1 but showing another form of the invention.

Fig. 11 is a vertical sectional view of Fig. 10.

Fig. 12 is a fragmentary view taken on the line 12—12 of Fig. 10.

The reference numeral 10 indicates generally a box having an open top closed by a glass plate 11. Within the box a glass or aluminum horizontal partition 12 is positioned. The top face of this partition is polished for offering small resistance to moving of objects upon its surface. Various stationary objects are arranged upon the partition such as land 13, reefs 14, islands 15, sea-weed area 16 and the like. Latitude and longitude lines 17 are also arranged upon the top face of the partition. A plurality of other loose movable objects rest upon the top face and may be ships 18, shipwrecks 19, submarines 20, mines 21 and icebergs 22.

Each of the movable objects have permanent interior magnets. These magnets may be positioned in various ways, for example, in Fig. 3 a permanent bar-magnet 23 is shown in a horizontal position in the ship 18. In Fig. 4 the ship 18 is shown provided with a vertical bar-magnet 24. It is pointed out that when the magnet is in the vertical position, one pole either its north or its south pole is disposed at the bottom and against the partition. When the magnet is in the horizontal position as shown in Fig. 3 both poles are at the bottom against the partition. The magnets are not limited to bar-magnets and may be horse-shoe or other types.

A plurality of stationary magnets 25 and 26 are attached upon the bottom face of the partition. The numerals 25 indicate horse-shoe magnets and 26 bar-magnets. The horse-shoe magnets have both of their poles against the partition while the bar-magnets have only one of their poles in contact with the partition. The magnets 25, 26 are all electro-magnets and are connected with a plurality of contacts 27 upon a contact board 28. Two contact boards are shown in Fig. 1 for it is intended that two players operate the device.

The operation may be individual or simultaneous. An operating arm 29 with a handle 30 is movably mounted upon the contact board 28. This operating arm has a slot 31 with a pair of opposite spring contacts 32. These spring contacts engage against a stationary contact 33 projecting from the contact board. In Fig. 8 schematic wiring has been shown and it will be clear that the contact arm which has a front contact point 34 may be individually engaged against any of the contacts 27 for closing one circuit thru one of the electro-magnets.

A coin slot 35 has been shown on the top of the contact board and coins may be deposited in this slot and arranged to turn on an electric current for operating the device so that different players may use the device upon payment. Coin operated switches are old in the art and any type switch may be used and for this reason a detail of the switch has not been shown.

The game may be played according to various rules as for example, if a player can skillfully navigate one of the ships and elude an enemy and also have no collisions or run upon reefs, he may be given the title as a qualified skipper and a certain amount of points. Should he sink an enemy, he would also receive points. If he can reach a certain position of latitude and longitude, he could be given the title of a navigator and receive certain points for this. Should he hit a mine, certain points could be subtracted and in this fashion various rules for playing the game can be arranged.

In the modified form shown in Figs. 5 and 6, a golf course has been illustrated. The arrangement is similar as in the preferred form, that is a box 36 is provided with an open top closed by glass 37. Within the box there is a horizontal glass or aluminum partition 38 and upon this partition the course is laid out. On the course numeral 39 indicates green felt representing grass, numeral 40 indicates a tree, 41 a water hole and numerals 42 various holes used in playing the game of golf.

Light weight golf balls 43 are loosely arranged upon the top of the partition 38 and are provided with central permanent magnets. A plurality of electro-magnets 25 and 26 are attached upon the bottom of the partition 38. These magnets may be scattered zigzag along the course of the golf game. The golf holes 42 consist of movable platforms 44 normally urged into raised conditions by springs 45. When a golf ball enters one of these holes it depresses the platform 44 and closes a circuit thru contacts 46 and 47 for ringing an electric bell such as 48.

The game of golf may be played according to various rules which should closely resemble the real game. Each of the magnets 25 and 26 are connected with a contact board 28' provided with a plurality of contacts 27' and an operating lever 29' arranged in a fashion similar to the arrangement disclosed in the preferred form of the device.

Each of the magnets 25 and 26 are provided with tongues 49 slidably engaged in short grooves 50 formed in the bottom of the partition. Before a game is started the players may shake the game device so that the magnets 25, 26 assume any positions in the grooves 50, and so that the balls are removed from the holes. This prevents players from memorizing the exact positions of the various magnets and adds entertaining features to the game in that certain of the magnets may shift during the shaking process and others may remain stationary. The grooves should not be of very great lengths so that the magnets stay in their particular vicinities.

It is to be understood that my game may be provided with a suitable electric indicator 51 hereinafter further described which may be operated by the coin controlled device to indicate that the game is ready for starting or may be operated by a plurality of switch buttons 52 to indicate or record that the player is penalized, disqualified, or that the game is over.

These indications may be written on the indicator 51 or different colors may represent these conditions.

In Figs. 10, 11, and 12, an additional movable object 18' in the form of an observation balloon is shown which object is more illusive than ships 18 and the other loose movable objects. The observation balloon 18' may be moved towards the North or the South poles 55 by attracting the bar magnet 18ᵃ of the observation balloon by the stationary magnets and magnets 25'.

At each polar region recess portions 56, 57, 58, and 59 are located for indicating prizes which may be awarded in playing the game when the observation balloon 18' stops over and engages into one of the said recess portions.

The score points 50, 100, 200, and 500, are indicated in recesses 58, 56, 57, and 59, respectively, and the same score points are illuminated by electric indicators 51' when the player succeeds in drawing the observation balloon in the respective recess. The pocketed missiles may be removed from the pockets by shaking the device.

The electrical connection is illustrated in Fig. 12, in which resilient contact members 60 are secured to the horizontal partition at the portions 12' so that a movable pin or pins 61 will depress the contact members 60 into contacting position with the corresponding stationary contact terminal 62 when the observation balloon 18' rests upon one of the pins 61. The stationary contact terminals 62 are mounted on the back wall of the box 10. When contacts 60 and 62 are in an engaging position the corresponding electric bulb 51ᵃ will illuminate respective electric indicator 51'.

In other respects this latter form of the invention is identical with the previous forms of the invention and the various parts may be recognized by the corresponding reference numerals.

This game may be played by one or more players on game boxes of any desired size and shape, with movable and elusive objects simulating any article and a game board layout may also be varied as desired.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. An educational game, comprising a box, a horizontal partition therein having recessed portions on top thereof, movably mounted objects upon said partition, permanent magnets in the movably mounted objects, electro-magnets attached on the bottom of said partition, and means for individually energizing the electro-magnets, consisting of a contact board with contacts wired to the electro-magnets and a movably mounted contact arm engageable with the contacts and connected with a line contact, a fixed and a movably mounted contact member below each of the said recess portions, plunger pins projecting into apertures in the recessed portion from the movably mounted contact members, said plunger pins being adapted to be depressed when said objects engage in said recesses, a lamp for each of said movably mounted contacts and connected to a source of electricity, and circuits including said lamps, said source of electricity, and said contacts for lighting said lamps when said contacts are depressed.

2. An educational game, comprising a box, a horizontal partition therein having recessed portions on top thereof, movably mounted objects upon said partition, permanent magnets in the movably mounted objects, electro-magnets attached on the bottom of said partition, and means for individually energizing the electro-magnets, consisting of a contact board with contacts wired to the electro-magnets, and a movably mounted contact arm engageable with the contacts and connected with a contact, fixed contacts supported below said recessed portions, movably mounted contacts resiliently supported between said fixed contacts and said recessed portions, plunger pins on said movably mounted contacts and adapted to extend into apertures in said recessed portions, said plunger pins being adapted to be depressed when said objects engage in said recesses, a lamp for each of said movably mounted contacts and connected to a source of electricity, and circuits including said lamps, said source of electricity and said movably mounted and fixed contacts for lighting said lamps when said contacts are depressed.

HAROLD SASS.